June 16, 1964  J. H. ROTHERAINE ETAL  3,137,476
SELF-SECURING FAUCET WASHER
Filed Feb. 3, 1961
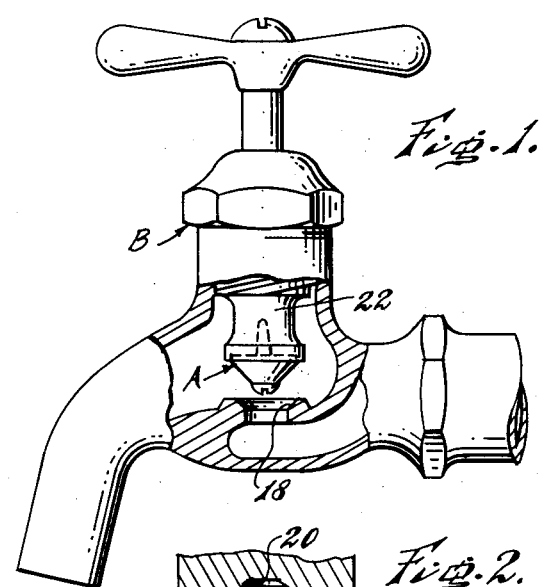
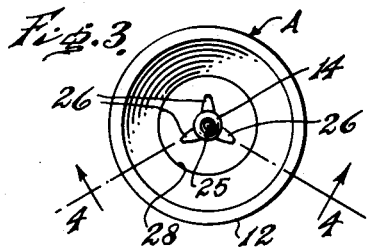
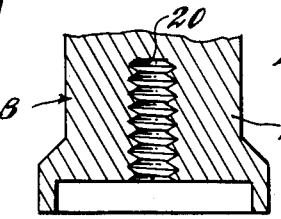
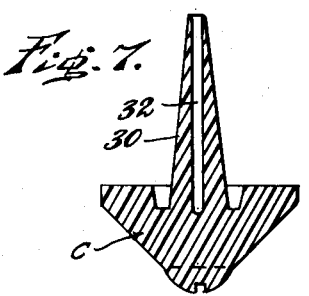
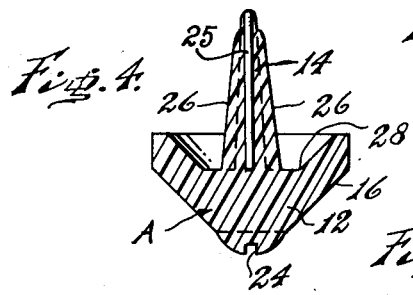
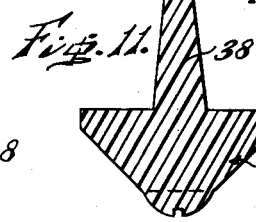
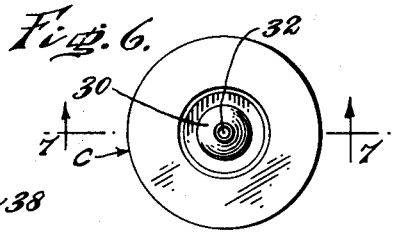
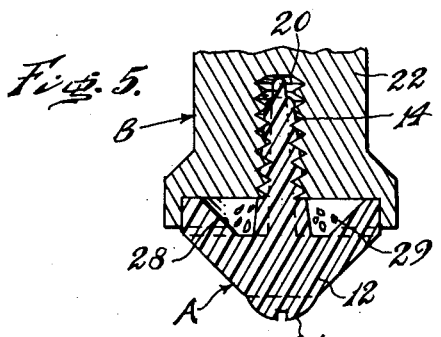
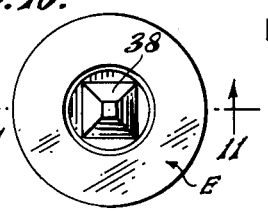
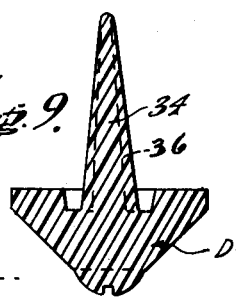
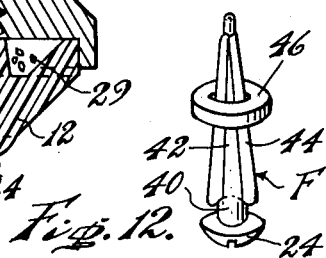
INVENTOR
Jerome H. Rotheraine
Haig Vartanian
BY
Bilker & Mazerman
ATTORNEYS

# United States Patent Office 3,137,476
Patented June 16, 1964

3,137,476
SELF-SECURING FAUCET WASHER
Jerome H. Retheraine, 729 Longshore Ave., and Haig Vartanian, 4935 Ella St., both of Philadelphia, Pa.
Filed Feb. 3, 1961, Ser. No. 87,012
1 Claim. (Cl. 251—357)

Our invention relates to a water faucet washer and more particularly relates to an interchangeable washer which is secured to a valve stem and acts as a seat closure for the orifice of faucets and valves commonly used in homes, offices and factories.

The replaceable washer customarily utilized in water faucets comprises a "doughnut" or annular ring member which is fabricated of leather, rubber or plastic compositions and is secured to the bottom of a valve stem by passing the neck of a brass screw through the washer opening and threading the screw into a complementary tapped hole in the stem. When the faucet develops a "drip" as a result of washer wear, the "do-it-yourself" repairman generally purchases a package of washers in a kit containing several washer sizes together wtih a plurality of differently sized screws which fit the standard house faucets. The screw sizes ordinarily supplied in these kits are one each of #6–32, #8–32, #10–32 and #10–24.

If the house faucets were all of the same size and if the previously employed screw were corroded or stripped, only one faucet could be repaired per kit even though such kit packages contain 4 to 8 washers and 4 screws. That is, these kits are made up for adaptability rather than economy.

When none of the screws in the kit fits a particular faucet stem of non-standard size, the amateur repairman, with limited knowledge of screw sizes, usually runs to the local hardware store for the purchase of an odd screw size and endeavors to describe the particular screw required to fit his faucet. If the tapped hole in the stem were to have been stripped as a result of layman inexperience in starting the screw, a very expensive repair bill may be incurred in replacing the faucet entirely together with the inconvenience in having the water shut off while awaiting the plumber. Lastly, if the conventional metal screw were corroded within the stem mounting hole, attempts to remove the screw for replacement of the washer frequently caused the screw head to shear which necsssitated drilling out the old stem followed by retapping of the hole or, again, replacement of the faucet.

It is therefore an object of this invention to provide a securing means for a faucet washer which can be universally accommodated by faucet stem tapped holes of various diameters and thread size.

Another object of our invention is to provide a combined washer and securing means therefor wherein a plurality of valve sizes may be accommodated by a single washer size.

Another object of our invention is to provide a faucet washer having securing means thereon for mounting the washer to a faucet stem without the use of any tools.

Another object of our invention is to provide a securing means for a faucet washer which is corrosion and acid resistant.

Another object of our invention is to provide a self-threading, securing means for a faucet washer.

Another object of our invention is to provide a securing means for a faucet washer wherein the washer may be easily assembled upon or removed from tapped holes of faucet stems having stripped threads.

Other objects of our invention are to provide an improved device of the character described, that is easily and economically produced, which is sturdy in construction, and which is highly effective in operation.

With the above and related objects in view, our invention consists of the details of construction and combination of parts as will be more fully understood from the following detailed description when read in conjunction with the accompanying drawing in which:

FIG. 1 is a side elevational view of a conventional faucet, and partly broken away to show a self-securing washer embodying our invention.

FIG. 2 is an enlarged sectional view of the faucet valve stem.

FIG. 3 is a top plan view of one embodiment of our faucet washer.

FIG. 4 is a sectional view taken along lines 4—4 of FIG. 3.

FIG. 5 is a sectional view showing the faucet washer assembled to the valve stem.

FIG. 6 is a top plan view of another embodiment of our faucet washer.

FIG. 7 is a sectional view taken along lines 7—7 of FIG. 6.

FIG. 8 is a top plan view of a third embodiment of our self-securing faucet washer.

FIG. 9 is a sectional view taken along lines 9—9 of FIG. 8.

FIG. 10 is a top plan view of a fourth embodiment of our faucet washer.

FIG. 11 is a sectional view taken along lines 11—11 of FIG. 10.

FIG. 12 is a perspective view of a self-threading screw embodying our invention for use with a conventional washer.

Referring now in greater detail to the drawing in which similar reference characters refer to similar parts, we show in FIGS. 1, 2, 3 and 4 a self-securing, integrally-formed, faucet washer, generally designated as A, which is adapted to be mounted upon a conventional faucet, generally designated as B.

The washer A comprises a head portion 12 and a shank portion 14 which are integrally molded of any suitable plastic composition. However, we prefer that the washer A be fabricated of nylon (long-chain polymeric amide) because of its having superior self-threading characteristics and excellent thread strength when turned within a tapped hole. Other suitable compositions include Teflon (tetrafluoroethylene), Kel F (trifluoroethylene) and polyethylene.

The head portion 12 has a peripheral frustro-conical surface 16 which is adapted to seat against valve orifice 18 of the faucet B after the shank 14 has been threaded into tapped hole 20 of the stem 22. The conical surface 16 enables a plurality of orifice sizes to be accommodated with a single washer size. A slotted knob or screw head 24 may be formed at the apex of the head portion 12 whereby a screwdriver may be utilized for turning or removing the washer A from the hole 20. However, for most part, the shank 14 may be easily threaded into the ordinary tapped holes without the use of any tools whatsoever.

The shank 14 is progressively tapered in order that a range of tapped hole sizes may be easily accommodated. That is, the distal end of the shank is small enough to permit insertion thereof within a No. 6–32 tapped hole, for example, and the base of the shank is of sufficiently large diameter as to bite within a No. 10–24 tapped hole. A plurality of fins 26 radially extend from the shank, the flutes intermediate the fins providing a relief space for material cut from the shank during self-threading thereof. As shown in FIGURES 3 and 4, the fins 26 are symmetrically-spaced in a trilobal configuration about a tapered stem portion. The fins themselves are longitudinally tapered from the proximal end of the shank 14 to its distal tip to permit self-threading engagement with any one of a plurality of tapped hole sizes 20 in the stem 22 of the faucet B. An axial bore 25 is formed in the shank extending longitudinally therein from its distal end to a position substantially co-extensive with the depth of the dished recess 28. The bore 25 enables the shank 14 to be sufficiently flexible so as to permit partial collapsing thereof when inserted in small diameter tapped holes. The surface 28 of the head 12 is concavely dished about the base of the shank also to provide a relief for the ribbon or chips 29 which are cut from the shank during self-threading. This dished recess 28 thereby allows the washer head to be properly seated against the stem 22 without interference and in addition secures a greater degree of flexibility to the washer head portion 12 when it is closed against the valve orifice 18.

The washer A is mounted upon the stem 22 by inserting the end of the shank 14 into the tapped hole 20 and turning the head 12 by hand or by a screwdriver in engagement with the slotted knob 24. The internal threads of the tapped hole 20 will cut a complementary thread about the periphery of the shank 14 and the fins 26 thereof. The washer A is turned until the upper edge of the head portion 12 abuts the bottom surface of the valve stem 22, the ribbon or chips 29 cut from the shank being collected in the dished recess 28 as shown in FIG. 5.

If it is desired to replace the washer, the head is rotated in the opposite direction, again either by hand or by screwdriver. If, however, the head should perchance snap off or the shank jam in the tapped hole, the shank may still be easily removed by heating to approximately 350° F. to 400° F. until charred and thereafter cleaning the charred remains from the hole.

In FIGS. 6 and 7 is disclosed a faucet washer modification C wherein a tapered shank 30 having an axial bore 32 integrally extends from the head portion. The cored shank affords flexibility when threaded into a hole of small diameter.

In FIGS. 8 and 9, we show another modification D wherein the shank 34 has a plurality of longitudinally extending flutes 36.

In FIGS. 10 and 11 is shown a fourth embodiment of our invention wherein the faucet washer E has a shank 38 which is rectangular in cross-section.

It is to be observed that the upper surface of the head adjacent the screw shank may be flush as shown in FIG. 11, grooved as shown in FIGS. 7 and 9, or concavely dished as shown in FIGS. 4 and 5, depending upon the degree of flexibility desired in the washer proper. Any of these modifications may be utilized with any of the shank embodiments described above.

In FIG. 12, we show a self-threading screw F of a plastic composition such as set forth hereinbefore. The self-threading screw F has a neck 40 extending from the screw head 24 and a tapered shank 42 from which fins 44 radially project. In the screw embodiment F, any of the shanks shown in FIGS. 4, 7, 9, and 11 may be utilized without departing from the spirit of the invention. The shank 42 of the screw F is inserted through the hole of a conventional washer 46 so that the washer sits about the neck 40. Thereafter, the tapered shank 42 with its fins 44 is threaded into the tapped hole 20 of the faucet stem 22 in the usual manner to substitute for the brass screw normally employed.

Although our invention has been described in considerable detail, such description is intended as being illustrative rather than limiting, since the invention may be variously embodied and the scope of the invention is to be determined as claimed.

We claim as our invention:

In a faucet which includes a circular valve orifice and in reciprocable cooperation therewith a valve stem having a tapped hole axially formed therein, a self-securing washer comprising an integrally-molded head and shank formed of a plastic composition, said head having a base portion with a central dished circular recess concentrically disposed about said shank, and including an outer frustro-conical surface adapted to seat against various sizes of valve orifices, and a centrally disposed slotted knob portion at the apex of said frustro-conical surface for engagement with a screwdriver, said shank having a progressively-tapered circularly cross-sectioned stem portion centrally projecting from the recess of said base portion, symmetrically-spaced fins radially extending trilobally from said stem portion, and an axial bore in said stem portion extending from the distal end thereof to a position substantially co-extensive with the depth of the circular recess in said base portion, said trilobal fins being longitudinally tapered for self-threading engagement with any one of a plurality of tapped hole sizes in the faucet valve stem and said axial bore permitting collapsing of said stem portion when inserted within small hole sizes, the area intermediate adjacent fins defining flutes which extend from the periphery of said stem to the edges of the fins and providing a relief space for material cut from said fins during self-threading thereof, and the circular recess in the base portion of said head catching the thread chips from said shank whereby the washer may be secured to any one of variously sized faucet stems with said shank threaded in the tapped hole and with the base portion in firm abutment with the end thereof.

References Cited in the file of this patent

UNITED STATES PATENTS

| | | |
|---|---|---|
| 702,878 | Morrison | June 17, 1902 |
| 1,875,438 | Gabriels | Sept. 6, 1932 |
| 2,167,559 | Upson | July 25, 1939 |
| 2,194,961 | Walker | Mar. 26, 1940 |
| 2,952,439 | Koons | Sept. 13, 1960 |